(12) United States Patent
Pillman et al.

(10) Patent No.: US 11,197,568 B2
(45) Date of Patent: Dec. 14, 2021

(54) PARCEL STORAGE BOX

(71) Applicant: Parcert Limited, Truro (GB)

(72) Inventors: Lauren Elizabeth Pillman, Cornwall (GB); Luke Adam Chapman, Cornwall (GB)

(73) Assignee: PARCERT LIMITED

( * ) Notice: Subject to any disclaimer, the term of this patent is extended or adjusted under 35 U.S.C. 154(b) by 0 days.

(21) Appl. No.: 17/059,305

(22) PCT Filed: May 30, 2019

(86) PCT No.: PCT/GB2019/051474
§ 371 (c)(1),
(2) Date: Nov. 27, 2020

(87) PCT Pub. No.: WO2019/229439
PCT Pub. Date: Dec. 5, 2019

(65) Prior Publication Data
US 2021/0244222 A1    Aug. 12, 2021

(30) Foreign Application Priority Data

May 30, 2018  (GB) .................................... 1808775

(51) Int. Cl.
*A47G 29/20*  (2006.01)
*A47G 29/14*  (2006.01)
(Continued)

(52) U.S. Cl.
CPC ............. *A47G 29/20* (2013.01); *A01G 9/02* (2013.01); *A47G 29/141* (2013.01); *A47G 29/30* (2013.01);
(Continued)

(58) Field of Classification Search
CPC .. A47G 29/124; A47G 29/1214; A47G 29/20; A47G 29/141; A47G 29/30;
(Continued)

(56) References Cited

U.S. PATENT DOCUMENTS 6,032,808 A * 3/2000 Henson ............... A47G 29/1209
211/85.23
6,513,284 B1 * 2/2003 Sandlin .................. A01G 9/022
232/39

(Continued)

FOREIGN PATENT DOCUMENTS

AU   2012101817 A4   1/2013
DE   202013105279 U1   3/2014
(Continued)

OTHER PUBLICATIONS

Anonymous: "Pinterest—brievenbus plantenbak", Nov. 29, 2015 (Nov. 29, 2015) XP055620562, Retrived from the Internet: URL:https://n1.pinterest.com/pin/554857616570827625/ [retrieved on Sep. 10, 2019].

*Primary Examiner* — William L Miller
(74) *Attorney, Agent, or Firm* — Invention To Patent Services; Alex Hobson

(57) ABSTRACT

A parcel storage box (10) comprises a base (12), a side wall (14) and a roof (16) joined to form a box (18) and a parapet (28) provided on an upper surface of the roof (16), the parapet (28) enclosing a volume for planting plants. An opening (20) is provided in the side wall (14) and a door (22) is hinged to the side wall (14) to close the opening (20). A lock (24) is provided for locking the door (22). A barrier (42) is provided on the base (12), the barrier (42) having a front surface (44) for contacting a rear surface of the door (22) and an upper surface (46), the upper surface (46) being sloped (Continued)

relative to the base (12), the upper surface (46) being closer to the base (12) at a front edge of the barrier (42).

20 Claims, 6 Drawing Sheets

(51) Int. Cl.
*A47G 29/30* (2006.01)
*A01G 9/02* (2018.01)

(52) U.S. Cl.
CPC .. *A47G 2029/146* (2013.01); *A47G 2200/226* (2013.01)

(58) Field of Classification Search
CPC ............... A47G 29/14; A47G 29/16; A47G 2029/1226; A47G 2029/1228; A47G 2029/146; A47G 2029/148; A47G 2029/149; A47G 2200/226; A47G 7/08; A47G 7/041; A01G 9/02; E06B 7/26

USPC ............ 232/17, 19, 34–36, 38, 45; 340/569; 47/66.6; 49/469
See application file for complete search history.

(56) References Cited

U.S. PATENT DOCUMENTS

| | | | |
|---|---|---|---|
| 2001/0045449 A1* | 11/2001 | Shannon | G07C 9/21 232/19 |
| 2005/0253715 A1 | 11/2005 | Awobue | |
| 2009/0278001 A1* | 11/2009 | Sherburne | A47G 29/1216 248/146 |
| 2016/0060008 A1* | 3/2016 | Farentinos | E05B 49/002 220/211 |
| 2019/0329960 A1* | 10/2019 | Kale | A47G 7/00 |
| 2020/0245798 A1* | 8/2020 | Friscia | A47G 29/1216 |
| 2020/0250915 A1* | 8/2020 | Schachte | G07F 17/12 |

FOREIGN PATENT DOCUMENTS

| | | |
|---|---|---|
| EP | 2967244 A1 | 8/2017 |
| GB | 2524805 A | 10/2015 |

* cited by examiner

PARCEL STORAGE BOX

The present invention relates to a parcel storage box, particularly a parcel storage box having a planter on top.

BACKGROUND TO THE INVENTION

As the popularity of online shopping increases, growing numbers of parcels are delivered to homes. Often, the intended recipient is not able to be at home to receive the parcel due to work or other commitments. This can result in missed deliveries or parcels left in unsecure locations where they may be stolen or exposed to rain.

A solution to this problem is to provide a lockable storage box outside the home. The delivery operative may deposit the parcel in the storage box for later retrieval by the customer.

Typically, lockable storage boxes for parcels are of utilitarian and unattractive appearance. They may also be conspicuous and visible from the street, encouraging attempted theft. These storage boxes occupy space in front of a home, which may be undesirable in densely populated areas in which space is in short supply.

According to GB 2524805, it is known to provide a parcel storage box with a planter on top. The planter is formed by a parapet which extends around the periphery of the roof of the box to enclose a void into which soil and plants may be introduced.

A problem with the device of GB 2524805 is that when the plants are watered, whether deliberately or due to heavy rain, there is no drainage route for water to escape the planting void. This may lead to standing water in the planting void which can be detrimental to plant health, or overflows which may discolour the exterior of the storage box. In some eventualities, water may penetrate the storage box and damage a parcel stored within it.

A further problem arises in the practicalities of opening and locking the parcel storage box, for example in how to provide box access to a delivery operative while excluding thieves. This problem also extends to delivery verification: sometimes packages are for delivery only when a recipient signs for the package, to verify that the package has been received. Receipt verification is not possible with existing parcel storage boxes.

It is an object of the present invention to provide an improved parcel storage box for receiving a parcel or other object to be left or collected outside a home to mitigate these problems.

STATEMENT OF INVENTION

According to a first aspect of the present invention, there is provided a parcel storage box comprising a base, a side wall and a roof joined to form a box, an opening being provided in the side wall for receiving a parcel; a door hinged to the side wall for closing the opening; a lock for locking the door; and a parapet provided on an upper surface of the roof, the parapet describing a closed path around a planting area; and an internal barrier provided on the base, the barrier extending between opposite sides of the side wall and being sealed against fluid at its joins to the side wall, the barrier having a front surface for contacting a rear surface of the door and an upper surface, the upper surface being sloped relative to the base for deflecting water away from the interior of the box, the upper surface being closer to the base at a front edge of the barrier.

The base, sidewall, roof and door form a closed box, defining an interior cavity in which a parcel may be stored and preventing theft of the parcel. The lock prevents unauthorised access to the interior cavity. The parapet retains soil and plants on the top of the box, providing a planter. This improves the aesthetic appeal of the parcel storage box, provides an efficient use of space and partially disguises the function of the box, reducing the likelihood of attempted thefts. The barrier prevents moisture from pooling in the interior of the box if moisture penetrates the opening. For example, when watering the plants, moisture may enter around the upper edge of the door and run down a rear surface of the door. In this case, when the moisture runs to the bottom of the door, it will be caught by the barrier. The forward sloping upper surface prevents water from running off the barrier into the interior of the box.

The parapet may be formed as a separate unit to the box. That is, the parapet may be independent of the box.

At least one drainage aperture may be provided in the parapet. The drainage aperture allows water or other fluid to drain from the planter, i.e. the volume enclosed by the parapet. This prevents standing water from accumulating in the planter, which is beneficial for plant health.

The drainage aperture may be situated adjacent to an upper surface of the roof. This allows fluid to drain from the entire planter, so no standing water can accumulate in the bottom.

The drainage aperture may be provided on a back or side portion of the parapet for avoiding drainage of water over the door. This prevents drainage water from running over the front of the parcel storage box, where it may run behind the door and penetrate the storage box, which could damage a parcel stored inside.

A channel may be provided in the upper surface of the roof extending to the aperture. This improves drainage from the planter by guiding water to the vicinity of the aperture, through which it may drain to the exterior of the planter.

The parapet may be provided around the perimeter of the roof. This maximises the space available in the planter.

The lock may be (or include) a combination lock or a keypad (or touchpad). Providing a combination lock or keypad allows the parcel storage box to be accessed by a delivery operative without a physical key. The access code can be provided by the customer in the delivery instructions when placing an order.

The keypad may be located on the side wall or on the parapet (for example on a side wall of the parapet). The keypad may be substantially waterproof or sealed against ingress of water. A suitable wired or wireless connection between the keypad and the lock should be provided.

The door may be hinged at its bottom edge. A two-stage hinge or door opening system may be provided. The two-stage hinge or system may allow the door to be pivoted freely through a first angle, and the lock may then restrict the door from pivoting further until unlocked.

A handle may be pulled or actuated to move the door from a first closed position to a second closed position. The handle may be in the form of a recess in the side wall.

In its first closed (or locked) position, the door may be substantially flush with the side wall of the box. In its second closed (or locked) position, the door may be angled outwards from the side wall, exposing an upper side of the door. The upper side of the door may be hidden when the door is flush to the side wall of the box. The lock or keypad may be provided on the upper side of the door for concealment. The door may be locked in both closed positions, and may only be opened after the lock is unlocked in the second closed position.

A seal may be provided around the door. The lock may be disposed inwards of the door seal. In some embodiments, the keypad or combination lock may be disposed inwards of the door seal. In some embodiments, a bolt or other locking means may be disposed inwards of the keypad or combination lock.

The keypad may be substantially similar in colour or appearance to the side wall or door for improved aesthetics. The keypad, or elements or symbols thereof, may be illuminated or backlit. The light may activate when the door is in the second closed position. The light illuminates the keys so that they are easier to see in dim conditions, or easier to see against the side wall or door (particularly if non-contrasting colours are used for the keypad and host portion of the box).

The parapet may be detachable from the box. This is useful for transport. The parapet can be detached, rotated about a vertical axis and then reconnected to the box to provide a different arrangement. This is useful to allow the parcel storage box to be customised for use in a given area, for example so that the door can open on an unobstructed side without restricting the orientation of the parapet.

The parapet and the roof may be made of moulded plastic. This provides a lightweight and waterproof construction.

A plurality of apertures may be provided in the base for receiving fixings. This allows the parcel storage box to be secured to the ground without drilling additional holes, making theft more difficult.

A region of the base around each aperture may be thicker than the rest of the base. This improves the strength of the fixing of the parcel storage box to the ground.

A plurality of apertures may be provided in the side wall for receiving fixings. This allows the parcel storage box to be fixed to a wall, either in addition to or instead of being fixed to the floor.

A region of the side wall around each aperture may be thicker than the rest of the base.

An authentication key may be provided on the interior of the box for scanning by a delivery operative to verify delivery of a parcel. This allows parcels which must be signed for to be delivered in the absence of the intended recipient, as the authentication key replaces a signature to authenticate safe delivery.

The authentication key may be provided on a rear surface of the door. This provides easy access to the authentication pattern when the door is open.

The authentication key may be or include a matrix barcode, a line barcode or an alphanumeric key.

The parcel storage box may further comprise a camera for monitoring a space in front of the parcel storage box.

The camera provides additional security to the parcel storage box and surroundings, for example the driveway of a home, by allowing the owner to monitor the parcel storage box and its surroundings and providing a deterrent to potential thieves.

The camera may be mounted in the front wall of the parcel storage box.

The parcel storage box may further comprise broadcasting means for transmitting data from the camera. The data may be transmitted over the internet, preferably via a secure protocol, for reception by the owner of the parcel storage box. The owner of the parcel storage box may then remotely monitor the parcel storage box and its vicinity.

Internet enabled security cameras are known, and so the camera and its implementation will not be described in detail here.

The parcel storage box may further comprise a sensor for detecting when a parcel has been placed in the parcel storage box, a processor and a wireless communication means, in which the processor is adapted to monitor the sensor and cause the wireless communication means to transmit an alert when the sensor detects that a parcel has been placed in the parcel storage box.

The sensor allows detection of the delivery of a parcel, which allows the processor and wireless communication module to notify an intended recipient of the parcel by transmitting an alert. Once notified, the intended recipient can retrieve the parcel promptly, minimising the time the parcel spends in the parcel storage box and thus reducing its exposure to theft or moisture damage.

The sensor may be or include a mechanical sensor adapted to detect when the door is opened. This provides a means of detecting when a parcel has been delivered.

The sensor may be or include a weight sensor (which may be electronic or mechanical, for example) arranged to detect the weight of a parcel when the parcel is placed in the box. This provides an alternative or additional means of detecting when a parcel has been delivered.

A solar panel may be provided on or connected to the parcel storage box. A power storage means (such as batteries) may be provided in the parcel storage box. The solar panel can be connected to the power storage device. The power storage means may be a back-up power source to ensure the box can be used in the event of mains power failure (if connected) or insufficient power generation from solar power, for example.

Power can thus be supplied to electronic components of the box. This includes but is not limited to any one or more of the following: an electronic keypad; an electronic weight sensor, broadcasting means; a camera; a processor; wireless communication means.

A stand may be provided for the parcel storage box. The stand raises the box off the ground. The internal storage volume of the parcel storage box may be improved for the same size of box footprint, if the vertical depth of the box is increased.

According to a second aspect of the invention, there is provided a method of delivering a parcel to a parcel storage box according to the first aspect of the invention and including a sensor for detecting when a parcel has been placed in the parcel storage box, a processor and a wireless communication means, in which the processor is adapted to monitor the sensor and cause the wireless communication means to transmit an alert when the sensor detects that a parcel has been placed in the parcel storage box, the method comprising the steps of: by a delivery operative, receiving an access code; by the delivery operative, using the access code to unlock the lock of the parcel storage box, opening the door of the parcel storage box and placing the parcel within the parcel storage box; by the sensor of the parcel storage box, detecting that the parcel has been placed within the parcel storage box; by the processor of the parcel storage box, causing the wireless communication means to transmit an alert.

The alert may be transmitted to a portable electronic device of an intended recipient of the parcel.

The alert may be a Short Message Service (SMS) message.

BRIEF DESCRIPTION OF THE DRAWINGS

For a better understanding of the present invention, and to show more clearly how it may be carried into effect, reference will now be made by way of example only to the accompanying drawings, in which.

DESCRIPTION OF PREFERRED EMBODIMENTS

Figure 1:
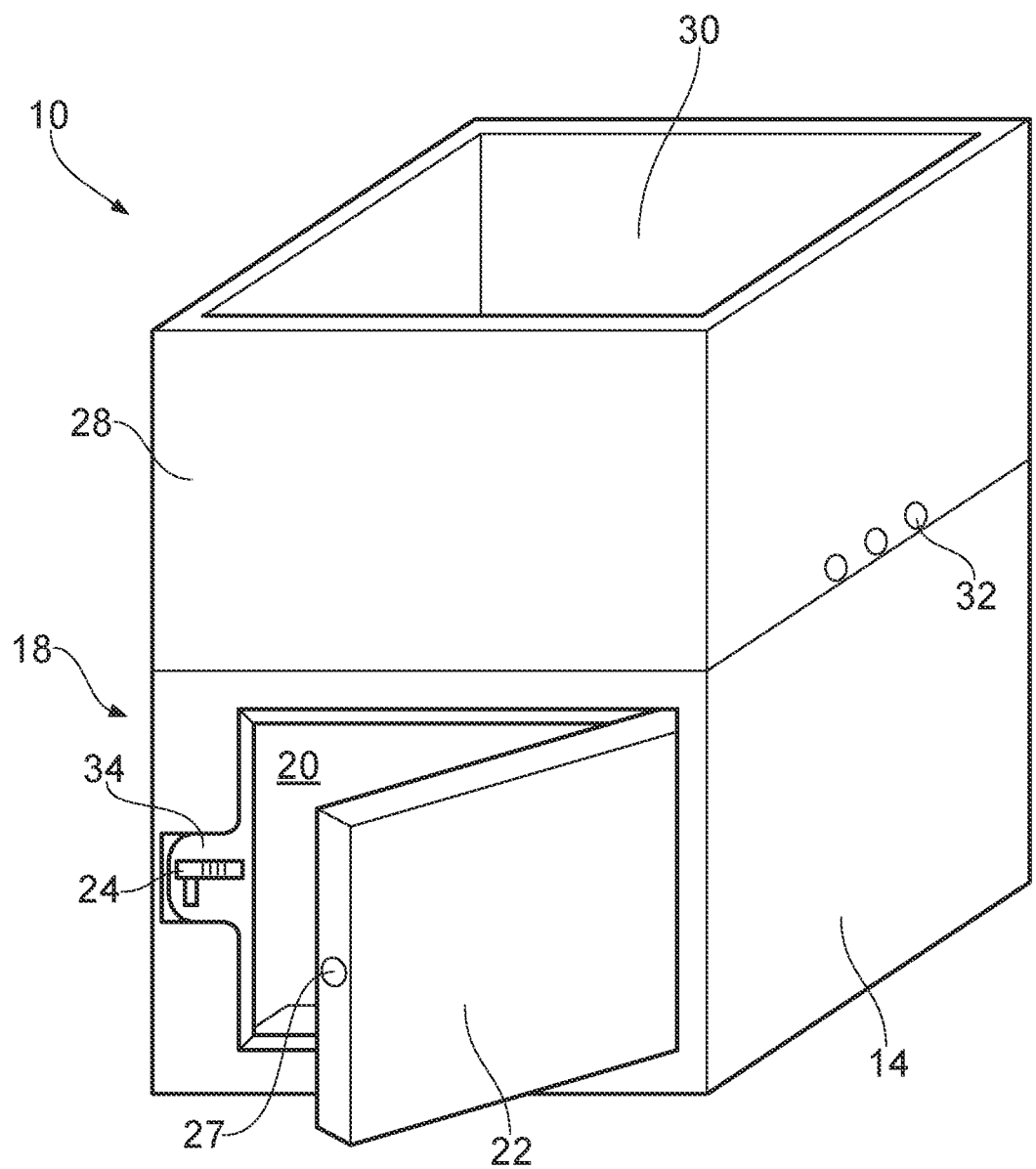
FIG. 1 shows an isometric view from the front of a parcel storage box.

Referring firstly to FIG. 1, a parcel storage box is indicated generally at 10.

The parcel storage box 10 includes a base 12, a side wall 14 and a roof 16. The base 12 is joined to the roof 16 via the side wall 14. This forms a box 18.

The thickness of the base 12 is between 5 mm and 10 mm.

In this embodiment, the box 18 is cuboid. However, in other embodiments, other shapes may be provided. For example, the box may have a semi-circular footprint or may have the form of a trapezium.

The side wall 14 is vertical in this embodiment, that is, it is perpendicular to the base. However, this is not necessary and a sloped or curved side wall may be provided.

A front side of the side wall 14 is thicker than the roof 16 and the base 12. The front side of the side wall 14 has a thickness of 20 mm.

An opening 20 is provided in the side wall 14. The opening 20 is provided in the front side of the side wall. If the side wall is curved, the opening 20 is provided facing in a front direction. The opening 20 is rectangular.

A door 22 is provided in the opening 20. The door 22 is a rectangular panel of substantially the same size and aspect ratio as the opening 20. The door 22 is hinged to the side wall 14. Although in this embodiment the door 22 is hinged at a side edge, in other embodiments it may be hinged at a top or bottom edge.

The parcel storage box 10 includes a lock 24 for locking the door 22. The lock 24 is provided on the side wall 14 adjacent to the opening 20. The lock 24 is a combination lock. In a locked position, a bolt 26 extends from the lock into a bore 27 in the edge of the door 22.

A parapet 28 is provided on the roof 16. The parapet 28 is a vertical side wall. The parapet 28 follows a closed path, that is, there are no gaps in the parapet 28. The parapet 28 extends around the periphery of the roof 16. The parapet 28 is joined at a lower edge to the roof 16. The parapet 28 defines an inner volume 30 having an open top.

The inner volume 30 is suitable for use as a planter. That is, it may be filled with soil, rocks, mulch or other matter in which vegetation may be planted. The soil or other matter is retained by the side wall 28. The roof 16 forms the base of the planter, and separates the soil and plants from the box 18 beneath.

Drainage apertures 32 are provided in the parapet 28. There are three drainage apertures 32. Each drainage aperture 32 is a through-aperture in the parapet 28. Each drainage aperture 32 is provided at the bottom edge of the parapet 28, that is, adjacent to the roof 16. The drainage apertures 32 are provided on a side face of the parapet, that is, neither on the face above the opening 20, nor on the face opposite that face.

The parapet 28 is formed of moulded plastic. In other embodiments, the parapet 28 may be formed from fibreglass, fibreclay, metal or wood. If a non-waterproof material is used for the parapet 28, a waterproof sealing layer (not shown) may be included.

The parapet 28 is formed as a separate unit to the box 18. The parapet 28 is glued to an upper surface of the box 18. The parapet 28 and box 18 may respectively include a base and a roof, which are joined together to form the roof referred to in the claims, or one of these may be omitted.

Figure 2:
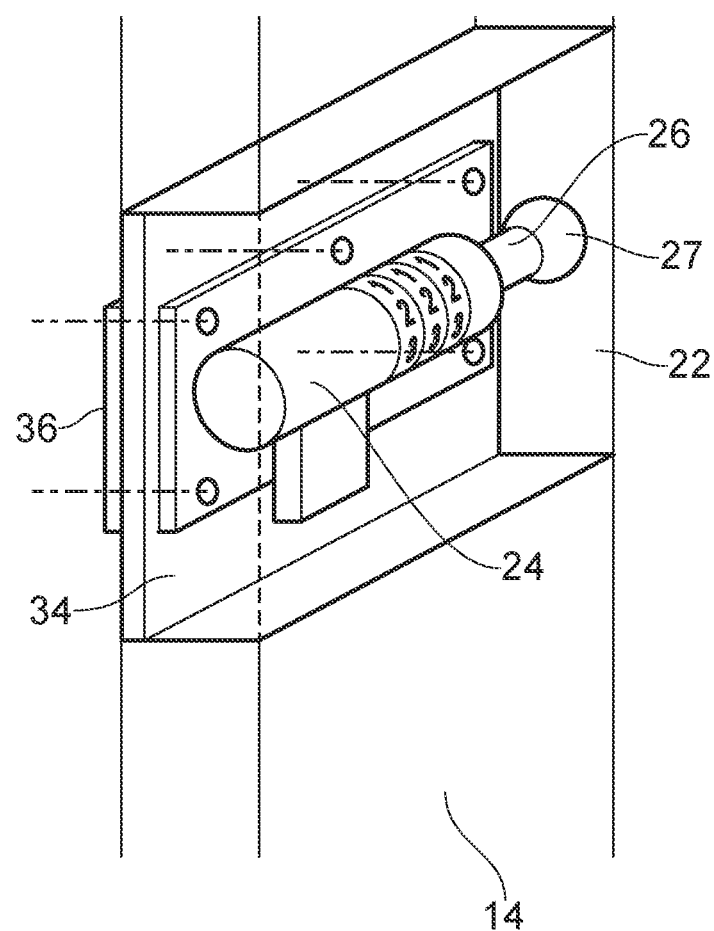
FIG. 2 shows an isometric cross sectional close-up view of a lock of the parcel storage box of FIG. 1.

Referring now to FIG. 2, the lock 24 is provided in a recess 34 in the side wall 14. The recess 34 is a region of the side wall of reduced thickness. The recess 34 is provided in the front surface of the side wall 14. A reinforcing plate 36 is provided behind the recess 34. The reinforcing plate 36 is provided on interior of the side wall 14. The reinforcing plate 36 is made of metal. The lock 24 is secured to the reinforcing plate 36 through the side wall 14 using fixings.

An upper surface of the roof 16 includes a plurality of drainage channels (not shown). Each drainage channel is a groove in the upper surface of the roof 16. The drainage channels form a grid pattern. The drainage channels slope downwards towards the drainage apertures.

Figure 3A:
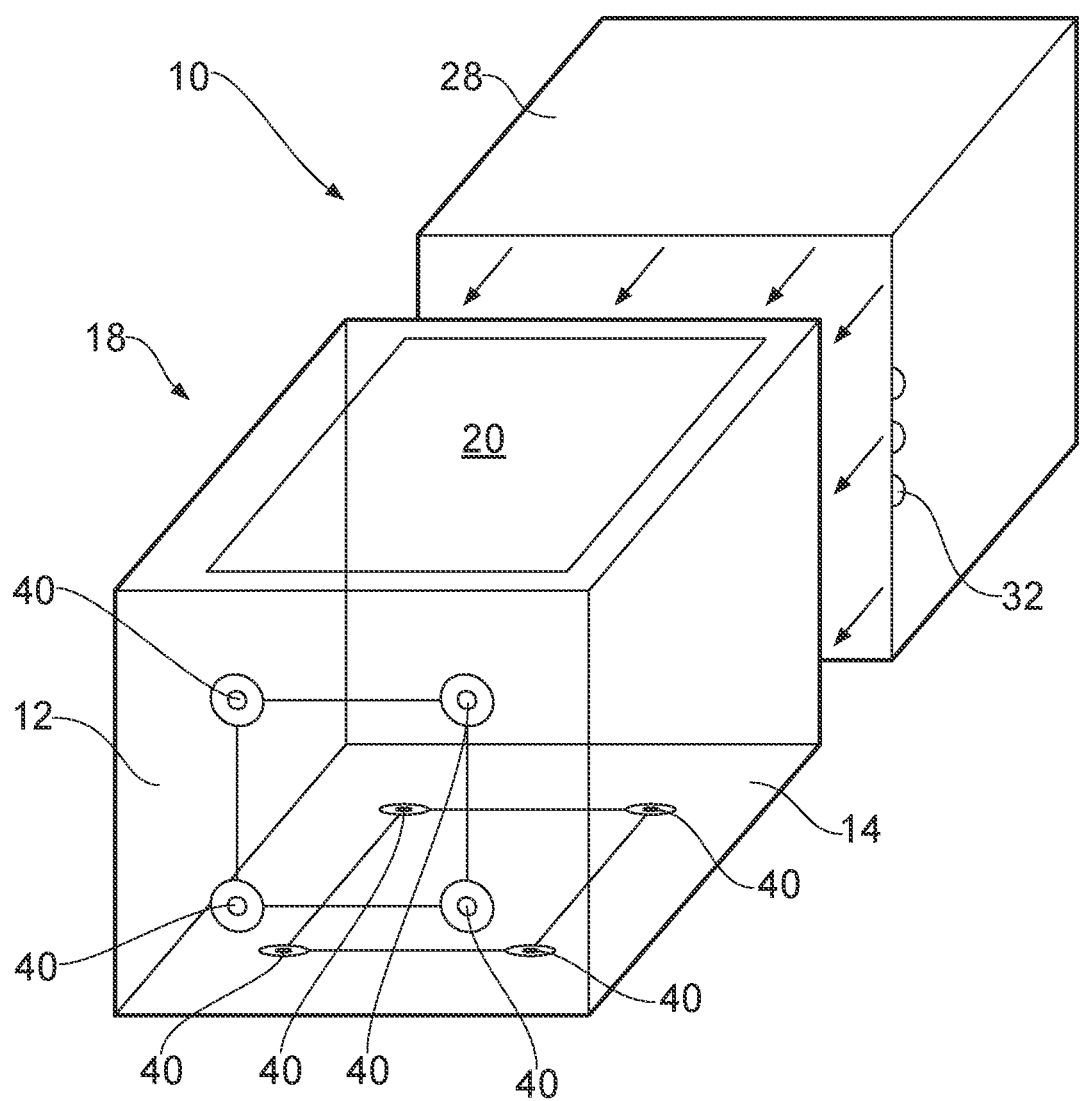
FIG. 3a shows an isometric view from below of the storage box of FIG. 1 in a pre-assembled condition and with the box portion transparent and the door, lock and recess omitted.
Figure 3B:
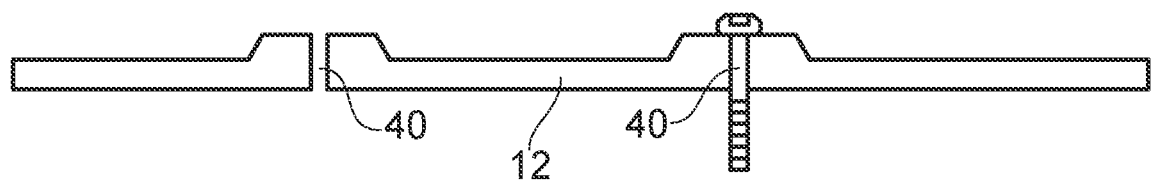
FIG. 3b shows a cross-sectional view of the base of the parcel storage box of FIG. 1.

Referring now to FIGS. 3a and 3b, a plurality of fixing apertures 40 is provided in the side wall 14 and the base 12. Each fixing aperture 40 is a through aperture in the side wall 14 or the base 12. Each fixing aperture 40 is surrounded by a thickened region of the side wall 14 or the base 12. Each thickened region is annular in shape. Four fixing apertures 40 are provided in each of the side wall 14 and the base 12. The fixing apertures 40 of the side wall 14 are provided on a rear side of the side wall, that is, opposite to the opening 20.

The fixing apertures are suitable for receiving fixings such as bolts or screws. Fixings may be used to secure the parcel storage box to the ground (via the apertures in the base 12) or a wall (via the apertures in the side wall 14) or both. Apertures are provided in the rear face of the side wall 14 so that the rear of the parcel storage box may be fixed to a wall, for example a front wall of a house, while leaving the front face accessible for receiving parcels.

Fixing the parcel storage box to the ground in this way prevents theft of the box.

Figure 4:
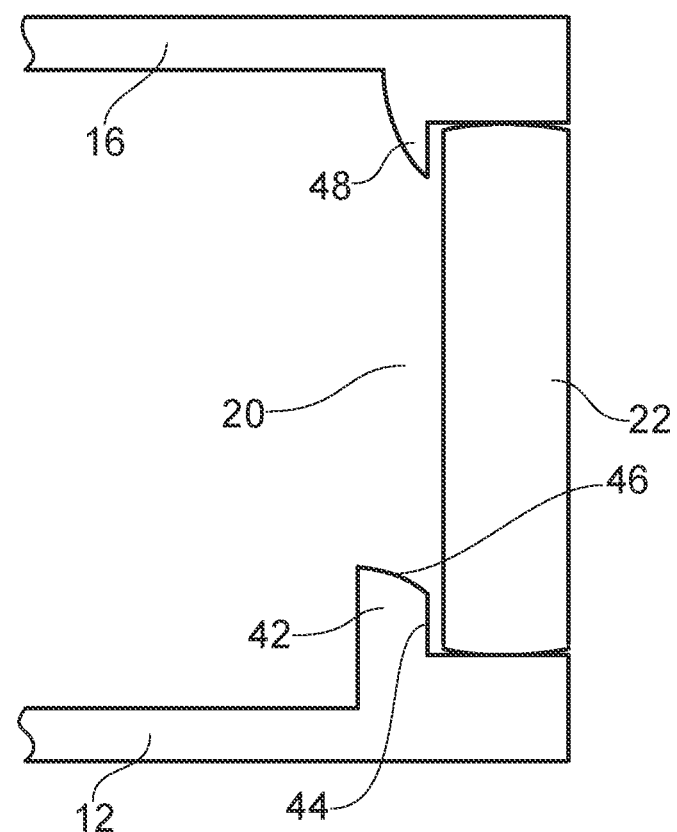
FIG. 4 shows a cross-sectional view of part of the box portion of the parcel storage box of FIG. 1.

Referring now to FIG. 4, a barrier 42 is provided on the base 12. The barrier 42 is on an upper surface of the base 12. The barrier 42 is within the interior of the box 18. The barrier 42 is an elongate member protruding from the base 12 joining opposing sides of the side wall 14.

The barrier 42 has a front surface 44 and an upper surface 46. The front surface 44 is vertical, that is, it is perpendicular to the base 12. The upper surface 46 is sloped, that is, it is at an angle to the base 12. The angle between the upper surface 46 and the base 12 is 30 degrees. The upper surface 46 slopes downwards towards the front, that is, the upper surface 46 is closed to the base 12 near the door 22.

The barrier 42 forms a barrier across the threshold of the opening 20 of the box 18.

A lip 48 is provided around the periphery of the opening 20 for bearing against a rear surface of the door 22. The lip 48 joins the barrier 42. Water seeping around the door 22 runs down the rear surface of the door 22 to the barrier 42 and drains out below the door.

An authentication key (not shown) is be provided on the interior of the box 18. In this embodiment, the authentication key is provided on the rear surface of the door 22. The authentication key is a matrix barcode, preferably a QR Code®. In other embodiments, the authentication key could be a line barcode or an alphanumeric key.

When delivering a parcel for which verification of delivery is desired, the delivery operative places the parcel in the parcel storage box and records the authentication key. For example, the delivery operative may scan the key using a handheld electronic device, upon which the key is recorded in a digital delivery roster. Alternatively, the delivery operative may transcribe the key, particularly if it is an alphanumeric key, onto a physical delivery roster such as a keyboard, for later digitisation. The delivery operative then closes and locks the door, and leaves the delivery site to continue his delivery route or return to a warehouse.

The roster may be accessible to the sender of the parcel via an internet server. The sender will have been provided with a delivery reference code, typically an alphanumeric code associated with the delivery. The delivery reference code is communicated to the server and the server returns an indication of whether the authentication key has been recorded in the roster. An expected authentication key may be stored on the server for matching with the scanned or transcribed authentication key.

This allows the sender or any other interested party which has been provided with the delivery reference code to verify that the parcel has been successfully deposited in the parcel storage box, which may be treated as equivalent to a signature verification of receipt, because the parcel storage box is a secure location accessible only by the intended recipient and authorised delivery operatives.

The parcel storage box 10 also includes a camera 50. The camera 50 is a video camera. The camera 50 is mounted in the front face of the side wall 14. The camera 50 is connected to broadcasting means (not shown). The broadcasting means is capable of broadcasting images or video footage from the camera over a communications network such as the internet. It is envisaged that the owner of the parcel storage box will be provided with an access password enabling him or her to remotely access the footage or images from the camera, for example from a portable electronic device such as a smartphone.

The parcel storage box 10 also includes a sensor for detecting when a parcel has been delivered (not shown). In this embodiment, an upper surface of the base 12 includes a weight sensor for detecting the weight of a parcel placed in the box 18. In other embodiments, a push button sensor may be provided on the edge of the opening 20 or edge of the door 22, such that the button is depressed when the door is closed. When the door 22 is opened, the button is released and it may be assumed that a parcel has been placed in the box.

The sensor is connected to communication means (not shown) for transmitting an alert when the sensor detects that a parcel has been delivered. The communication means transmits the alert over a communications network such as the internet or a phone network, and the owner or intended recipient of the parcel receives the alert, for example on his or her portable electronic device such s a smartphone. It is envisaged that a Short Message Service (SMS) message will be sent to the owner or intended recipient.

Figure 5A:
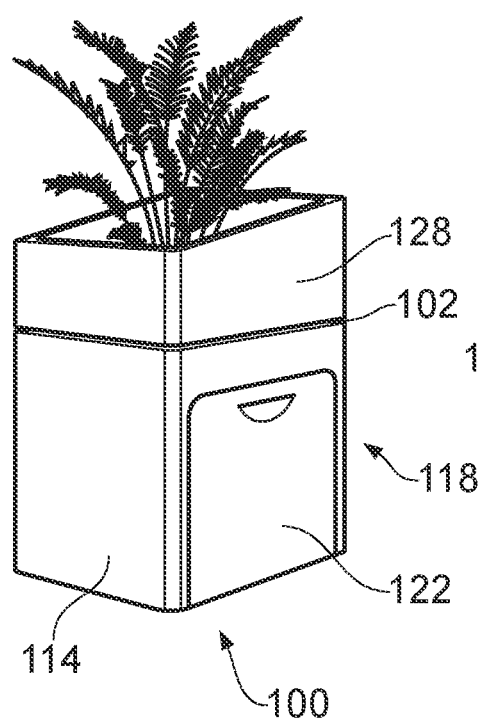
FIG. 5A shows a perspective view of a second embodiment of a parcel storage box with its door in a first locked position.
Figure 5B:
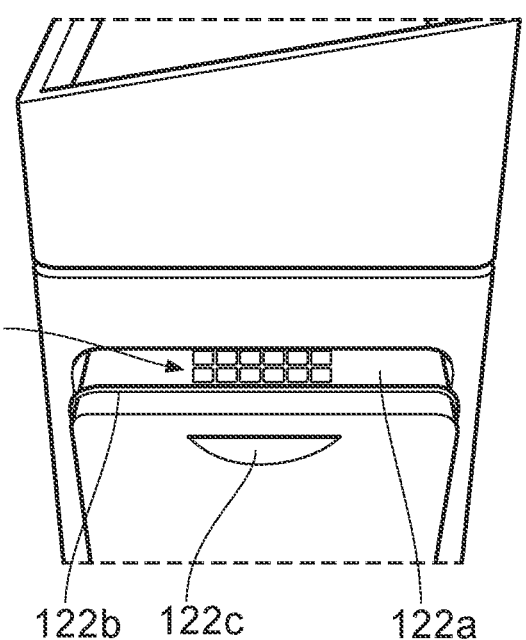
FIG. 5B shows a side perspective view of the parcel storage box of FIG. 5A with its door in a second locked position.
Figure 5C:
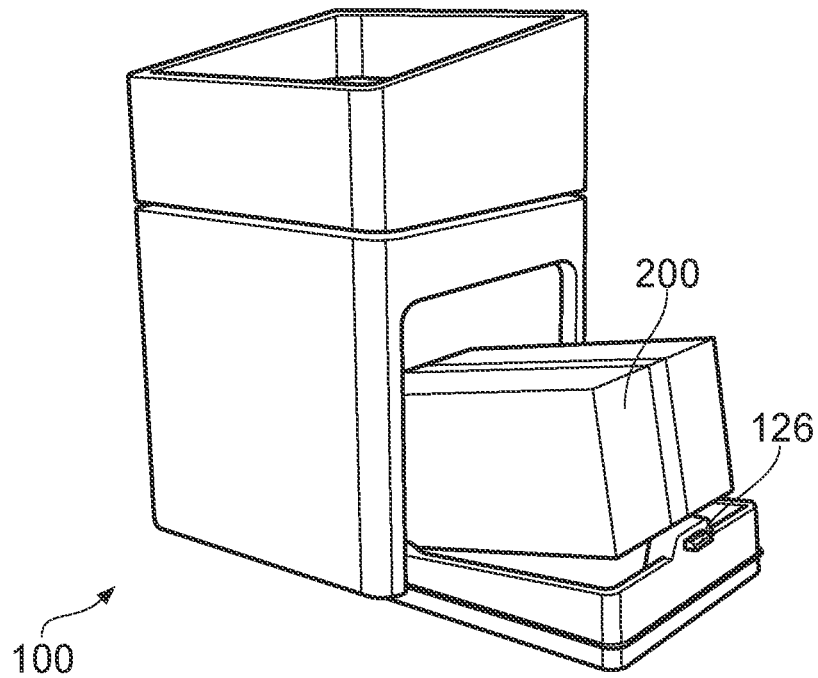
FIG. 5C shows a perspective view of the parcel storage box of FIG. 5A with its door open.

Referring also to FIGS. 5A to 5C, a second embodiment of a parcel storage box is indicated generally at 100. The parcel storage box 100 includes similar features to the preceding embodiment, and for brevity similar features will not be repeated unless necessary for context. Like reference numerals are used to refer to like features where possible. It will be appreciate that variations of the parcel storage box of this second embodiment may include any feature or features of the first embodiment.

The parcel storage box 100 includes a box portion 118 with a base, a sidewall 114 and a roof. A parapet 128 is provided on top of the box 118. A plant is provided on top of the box 100 in the parapet region. A gap 102 is provided between the parapet 128 and the top of the sidewall 114 or roof. The gap 102 runs substantially all of the way around the base of the parapet 128.

In this embodiment, the parapet 128 is taller at the rear than at the front. Front and rear walls of the parapet 128 have substantially level top surfaces. Side walls connected between the front and rear walls have substantially sloped top surfaces. This assumes that the parcel storage box 100 is upright. Providing a shorter front wall—or, in other words, a lower wall intended to be front-facing (rather than facing towards a wall)—provides a better view of a plant located in the planting area of the parapet, whilst the taller rear wall provides a suitable backdrop.

A door 122 is provided for an opening in the side wall 114. In this embodiment, the door 122 is provided on a side of the box 100 which corresponds to one of the side walls of the parapet 128. The door 122 is hinged at its bottom edge to the side wall 114.

The hinge is a two-stage hinge in this embodiment. That is, the door can be hinged open freely through a first angle whilst remaining locked, but it can only be opened further if unlocked. In FIG. 5A, the door is locked against opening in a first position, flush with the face of the side wall 114. In FIG. 5B, the door 122 is still locked against opening but in a second position, angled outwards in a different plane to the side wall 114. The door 122 in this embodiment is thick enough that it substantially fills or blocks the entire opening in the side wall 114 in both the first and second locked positions.

The door 122 is moved into the angled position by pulling on a handle 122c in the door 122. This exposes a keypad or touchpad, indicated generally at 124, on the upper surface 122a of the door 122. The keypad 124 includes twelve buttons in this embodiment, but it will be appreciated that any suitable number of buttons may be used.

A seal 122b runs across the top surface 122a and down sides of the door 122. The keypad 124 is set behind the seal 122b. A bolt 126 (see FIG. 5C) is set behind the keypad 124. The bolt 126 keeps the door 122 locked until the correct code has been entered. The bolt is substantially central in this embodiment. It will be appreciated that multiple bolts could be used in other embodiments.

FIG. 5C shows the door 122 in an open position, after the lock has been disengaged. The door 122 has been lowered by about 90 degrees. A parcel or package 200 is shown partly inside the box 118 for illustrative purposes. The parcel 200 can be pushed through the opening and the door 122 shut to re-engage the lock.

These embodiments are provided by way of example only, and various changes and modifications will be apparent to persons skilled in the art without departing from the scope of the present invention as defined by the appended claims.

We claim:

1. A parcel storage box comprising a base, a side wall and a roof joined to form a box, an opening being provided in the side wall for receiving a parcel;
   a door hinged to the side wall for closing the opening;
   a lock for locking the door;
   a parapet provided on an upper surface of the roof, the parapet enclosing a planting area; and
   an internal barrier provided on the base, the internal barrier extending between and joined to opposite sides of the side wall and being sealed against fluid at its joints with the opposite sides, the internal barrier having a front surface for contacting a rear surface of the door and an upper surface for deflecting water away from an interior of the parcel storage box, the upper surface being sloped relative to the base, the upper surface being closer to the base at a front edge of the internal barrier.

2. The parcel storage box as claimed in claim 1, including at least one drainage aperture in the parapet.

3. The parcel storage box as claimed in claim 2, in which the at least one drainage aperture is either: a) situated adjacent an upper surface of the roof; or b) provided on a back or side portion of the parapet for avoiding drainage of water over the door.

4. The parcel storage box as claimed in claim 2, in which a channel is provided in the upper surface of the roof extending to the at least one drainage aperture.

5. The parcel storage box as claimed in claim 1, in which the parapet is provided around a perimeter of the roof.

6. The parcel storage box as claimed in claim 1, in which the lock is or includes a combination lock or an electronic keypad.

7. The parcel storage box as claimed in claim 6, in which the electronic keypad is provided on the door.

8. The parcel storage box as claimed in claim 1, in which the parapet and the roof are made of moulded plastic.

9. The parcel storage box as claimed in claim 1, in which one or both of the following are provided: a first plurality of apertures is provided in the base for receiving fixings, and a second plurality of apertures is provided in the side wall for receiving fixings.

10. The parcel storage box as claimed in claim 9, in which a region of the base around each aperture in the first plurality of apertures is thicker than the rest of the base, or in which a region of the side wall around each aperture in the second plurality of apertures is thicker than the rest of the base, or a combination thereof.

11. The parcel storage box as claimed in claim 1, in which an authentication key is provided on the interior of the parcel storage box for scanning by a delivery operative to verify delivery of a parcel.

12. The parcel storage box as claimed in claim 11, in which the authentication key is provided on a rear surface of the door.

13. The parcel storage box as claimed in claim 1, further comprising a camera for monitoring a space in front of the parcel storage box.

14. The parcel storage box as claimed in claim 13, in which the camera is mounted in a front wall of the parcel storage box.

15. The parcel storage box as claimed in claim 13, further comprising broadcasting means for transmitting data from the camera.

16. The parcel storage box as claimed in claim 1, further comprising a sensor for detecting when a parcel has been placed in the parcel storage box, a processor and a wireless communication means, in which the processor is adapted to monitor the sensor and cause the wireless communication means to transmit an alert when the sensor detects that a parcel has been placed in the parcel storage box.

17. The parcel storage box as claimed in claim 16, in which the sensor is a mechanical sensor adapted to detect when the door is opened; or in which the sensor is a weight sensor arranged to detect the weight of a parcel when the parcel is placed in the parcel storage box.

18. A method of delivering a parcel to the parcel storage box as claimed in claim 16 comprising the steps of:
   by a delivery operative, receiving an access code;
   by the delivery operative, using the access code to unlock the lock of the parcel storage box,
   opening the door of the parcel storage box and placing the parcel within the parcel storage box;
   by the sensor of the parcel storage box, detecting that the parcel has been placed within the parcel storage box;
   by the processor of the parcel storage box, causing the wireless communication means to transmit an alert.

19. The method as claimed in claim 18, in which the alert is transmitted to a portable electronic device of an intended recipient of the parcel.

20. The parcel storage box as claimed in claim 1, in which the door is movable between a first locked position where the lock is concealed and a second locked position where the lock is exposed.

* * * * *